(12) United States Patent
Liu et al.

(10) Patent No.: US 6,410,865 B1
(45) Date of Patent: Jun. 25, 2002

(54) MECHANISM FOR EJECTING STYLUS

(75) Inventors: Ta-Wei Liu, Taipei; Chien-Min Lin, Junghe, both of (TW)

(73) Assignee: High Tech Computer Corp., Taoyuan (TW)

( * ) Notice: Subject to any disclaimer, the term of this patent is extended or adjusted under 35 U.S.C. 154(b) by 0 days.

(21) Appl. No.: 09/809,067

(22) Filed: Mar. 16, 2001

(30) Foreign Application Priority Data

Jul. 20, 2000 (TW) .......................................... 089212578

(51) Int. Cl.[7] .............................................. G08C 21/00
(52) U.S. Cl. ................ 178/19.01; 178/19.04; 178/19.05
(58) Field of Search .................. 345/173, 179; 178/18.01–18.07, 19.01–19.05

(56) References Cited

U.S. PATENT DOCUMENTS 5,067,573 A * 11/1991 Uchida .......................... 178/18
5,422,442 A * 6/1995 Gouda et al. ................... 178/18
5,434,373 A * 7/1995 Komaki ......................... 178/87

* cited by examiner

Primary Examiner—Vijay Shankar
(74) Attorney, Agent, or Firm—Rabin & Berdo

(57) ABSTRACT

A mechanism for ejecting stylus includes the locking apparatus and the ejecting apparatus. When the stylus is put in the slide groove, the movable arm of the locking apparatus exactly hooks the rabbet of the stylus resulting in the retention of stylus. The ejecting apparatus is used for ejecting the stylus along the slide groove. The locking apparatus and the ejecting apparatus are set separately at the end of the slide groove, and the distance between two apparatus is exactly equal to the length of the stylus.

5 Claims, 2 Drawing Sheets

MECHANISM FOR EJECTING STYLUS

This application incorporates by reference Taiwanese application Serial No. 089212578, Filed Jul. 20, 2000.

BACKGROUND OF THE INVENTION

1. Field of the Invention

The invention relates in general to a mechanism for ejecting a stylus, and more particularly to the mechanism for ejecting a stylus used in hand-held computers.

2. Description of the Related Art

Recently, the hand-held computer such as Personal Digital Assistant (PDA), which originated from the electronic secretary of the businessman, plays an important role in daily life. It acts as a small functional computer due to its delicate exterior and artificial intelligence (AI), and is capable of recording addresses, telephone numbers, appointments, and weekly schedules of work/homework. Furthermore, the PDA is also able to receive/send email and download/transmit data by taking advantage of the thriving Internet.

The PDA is convenient to us due to its several advantages; for example, it not only records and classifies thousands of telephone numbers, but also helps us to arrange weekly and/or daily schedules. With its small size, it can be placed into pockets, wallets, or handbags, and is easily accessed whenever needed. In addition, the special interface of the PDA, such as a touch screen and stylus make it more convenient to use.

Conventionally, the stylus of the hand-held computer is retained by friction of contact. If the stylus is needed, the friction of contact must be overcome before it is taken out and one end of the stylus must be held by a finger. This is very inconvenient and time consuming. The traditional ejecting apparatus, however, requires too large a space to meet the requirements of hand-held computers in terms of size and weight and so is not applicable to the hand-held computer.

SUMMARY OF THE INVENTION

It is therefore an object of the invention to provide a mechanism for ejecting the stylus used in the hand-held computers. The stylus is retained by a latching mechanism, and ejected due to the recovery force of a spring.

The invention achieves the above-identified objects by providing a mechanism for ejecting the stylus. The mechanism includes a locking apparatus and an ejecting apparatus. The locking apparatus and the ejecting apparatus are separately located at opposite ends of the slide groove, and the distance between these two apparatus is equal to the length of stylus. The locking apparatus is designed according to the theory of latching mechanism to achieve the retention of the stylus. When the stylus is inserted into the slide groove of the PDA, the movable arm of the locking apparatus exactly hooks the rabbet of the stylus resulting in the fixation of the stylus. If the stylus is needed, the release bottom is pressed resulting in the movable arm being removed from the rabbet, and the stylus is then ejected along the slide groove due to the recovery force of spring of the ejecting apparatus.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
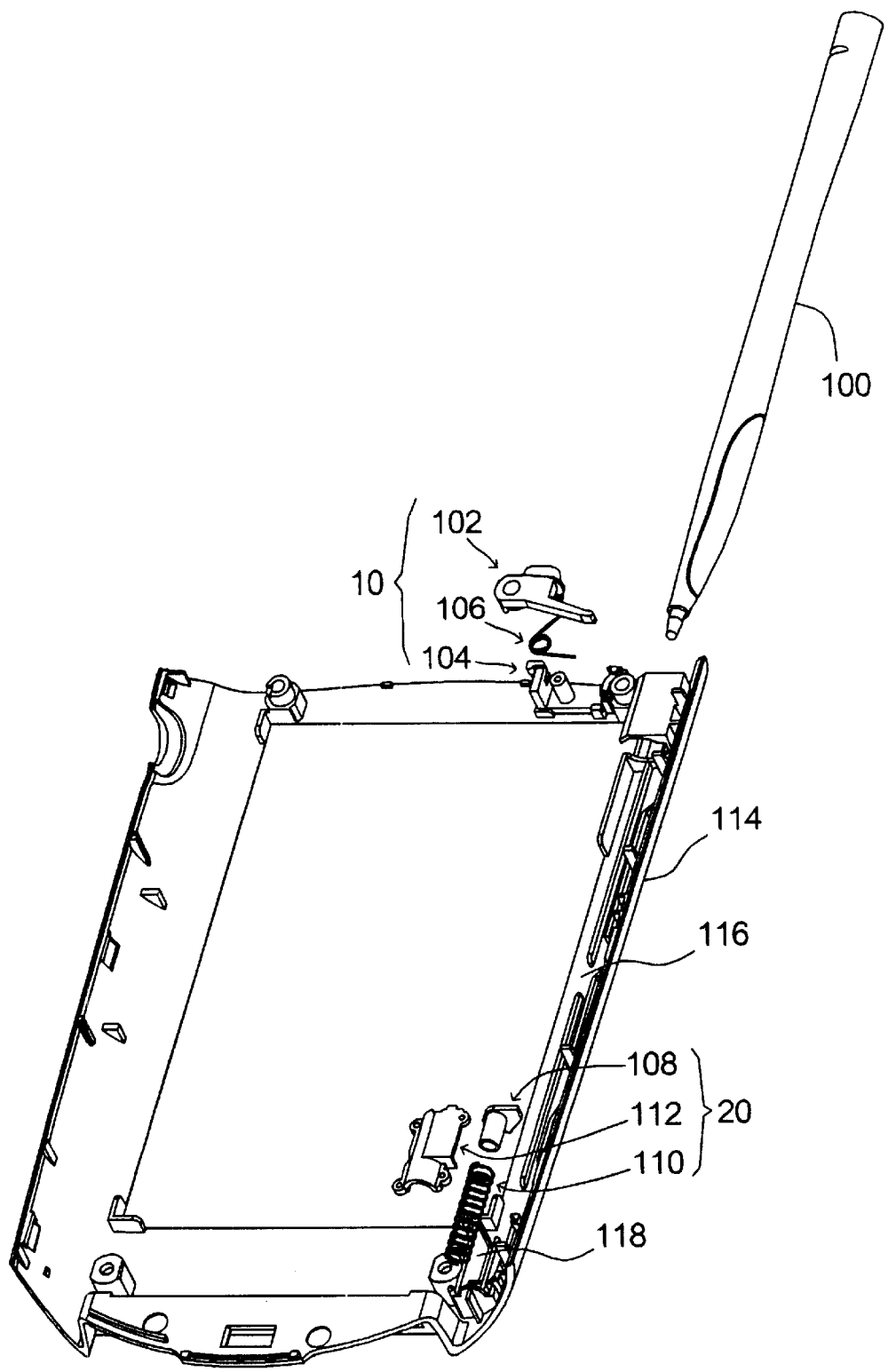
FIG. 1 illustrates a decomposed 3-D diagram of the mechanism for ejecting stylus according to the invention.

Referring to FIG. 1, in which a decomposed 3-D diagram of the mechanism for ejecting stylus according to the invention is presented. FIG. 1 is illustrated from a view of the inner side of housing 114 of the hand-held computer. The mechanism for ejecting the stylus includes the locking apparatus 10 and the ejecting apparatus 20. The stylus 100 is inserted into the slide groove 116. The slide groove 116 and the compress groove 118 are located at the housing 114 and the distance between the slide groove 116 and compress groove 118 is exactly equal to the length of stylus 100. With this unique design, the mechanism for ejecting the stylus only requires a small space, and the free space present in the hand-held computer is large enough to contain the entire mechanism. Hence, the present invention is very suitable for the hand-held computer.

The locking apparatus 10 is connected to the printed circuit board (not shown in FIG. 1), and the stylus 100 is retained by a latching mechanism. The locking apparatus 10 includes the lock element 102, the lock holder 104, and the lock spring 106. The pivot 202 on the lock holder 104 is able to support the lock element 102 while the lock spring 106 is placed between thereof. The ejecting apparatus 20 includes the eject cap 108, eject spring 110, and eject holder 112. The eject holder 112 covers the inner side of the housing 114 and forms a hollow area, the compress groove 118, which contains the eject cap 108 and eject spring 110. The eject apparatus 20 utilizes the reacting force that results from the recovery force of the compressed eject spring 110 to eject the stylus 100; therefore, the stylus 100 is pushed forward by the eject cap 108 and ejected instantly along the slide groove 116.

Figure 2:
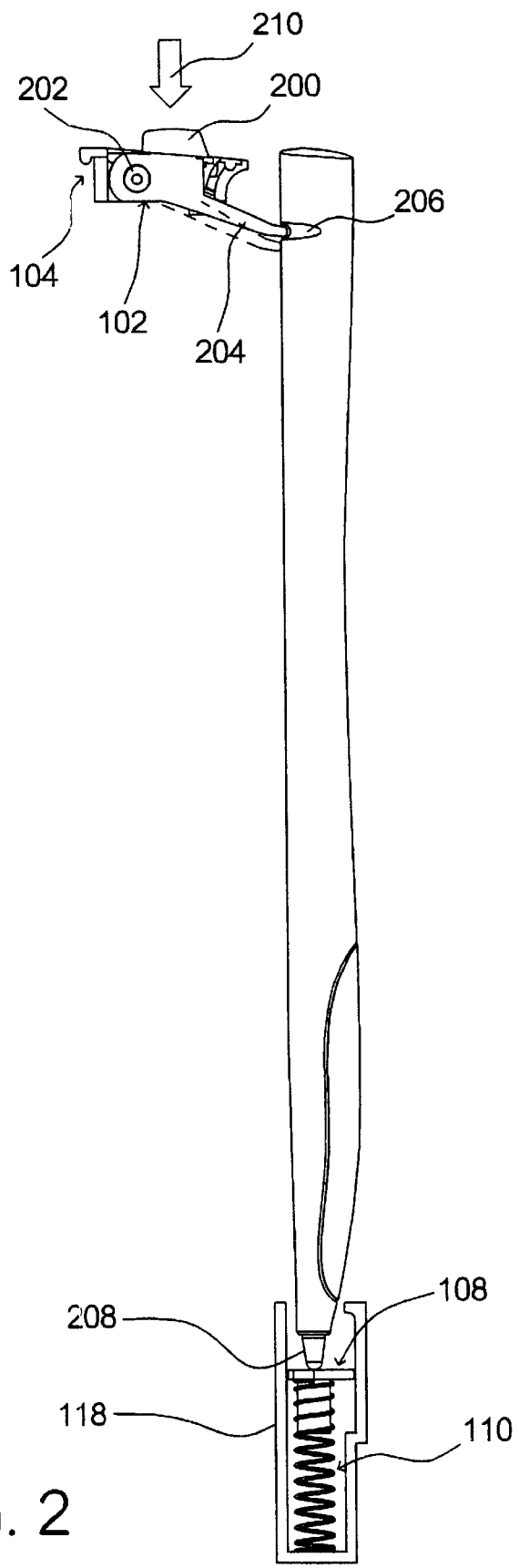
FIG. 2 illustrates an operating diagram of the mechanism for ejecting the stylus according to the invention.

Referring to FIG. 2, in which an operating diagram of the mechanism for ejecting the stylus according to the invention is illustrated. The locking apparatus 10 of the mechanism for ejecting the stylus further includes the release button 200 and the movable arm 204, as shown in FIG. 2. When the stylus 100 is inserted into the slide groove 1 16, the movable arm 204 exactly hooks the rabbet 206 of the stylus 100 resulting in the retention of the stylus. Meanwhile, the force balance is attained resulting from the equilibrium of the upward force of the eject spring 110 due to the elastic recovery and the downward force of the stylus 100 due to the latching mechanism.

If the stylus 100 is needed, the release button 200 is pressed by an external force 210 so that the lock element 102 rotates clockwise while the pivot 202 on the lock holder 104 is used as a revolving spindle. The lock element 102 is able to pull the movable arm 204 away from the rabbet 206 of the stylus 100. At the same time, the downward force acting on the eject cap 108 disappears, and the recovery force of the eject spring 110 pushes the eject cap 108 upward along the compress groove 118. Therefore, the pen point 208 is indirectly removed from the compress groove 118, and the stylus 100 is ejected upward along the slide groove 116. Additionally, the tensile stress due to the recovery force of the lock spring 106 is able to rotate the lock element 102 back to the original orientation after the movable arm 204 is removed from the rabbet 206.

According to the invention, the mechanism for ejecting the stylus used in the hand-held computer provides a convenient method of retention with a latching mechanism as well as ejection with the recovery force of the spring; hence, the stylus is easily stored and removed. Besides, the simple structure of the invention occupies so small a space that the present hand-held computers can satisfy the need without extra construction for appearance.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A mechanism for ejecting a stylus installed on a hand-held computer, wherein the hand-held computer includes a printed circuit board and a housing in which a slide groove is located in the inner side for placing the stylus, comprising:
    a locking apparatus connected to the printed circuit board which retains the stylus in the slide groove, the locking apparatus including:
        a lock element that includes:
            a movable arm that exactly hooks a rabbet of the stylus resulting in the retention of stylus; and
            a release button, wherein when the stylus is required, the lock element is rotated clockwise by pressing the release button in order to push the movable arm away from the rabbet of the stylus while the pivot on the lock holder is used as a revolving spindle;
        a lock holder; and
        a lock spring, wherein a pivot on the lock holder connects the lock element and the lock spring is placed between thereof; and
    an ejecting apparatus located in the inner side of the housing which ejects the stylus along the slide groove, wherein the locking apparatus and the ejecting apparatus are placed separately at opposite ends of the slide groove, and the distance between the locking apparatus and the ejecting apparatus is equal to the length of the stylus.

2. The mechanism for ejecting the stylus according to claim 1, wherein a tensile stress resulting from a recovery force of the lock spring rotates the lock element back to an original orientation.

3. The mechanism for ejecting the stylus according to claim 1, wherein the ejecting apparatus comprises
    an eject holder;
    an eject spring; and
    an eject cap, wherein the eject holder is connected to a inner side of the housing and form a hollow area, a compress groove, to place the eject cap and the eject spring.

4. The mechanism for ejecting the stylus according to claim 3, wherein a recovery force of the eject spring pushes the eject cap upward along the compress groove and the stylus is ejected upward along a slide groove.

5. A mechanism for ejecting a stylus, comprising:
    a housing having a slide groove formed therein, the slide groove being adapted
    to accommodate a stylus;
    a locking apparatus disposed at one end of the slide groove, and including:
        a lock holder having a pivot post;
        a torsion spring disposed on said pivot post; and
        a lock element pivotally disposed on said pivot post and over said torsion spring, said lock element having a movable arm that is engagable with a rabbet of the stylus, and a release button, wherein when the stylus is required, said lock element is rotated in a first direction about said pivot post by pressing the release button, thereby pushing said movable arm away from the rabbet of the stylus to allow the stylus to be removed from the slide groove, and when the stylus is inserted back into the slide groove, said torsion spring urges said lock element in a second direction that is opposite to the first direction, causing said movable arm to engage with the rabbet of the stylus to retain the stylus in the slide groove; and
    ejecting means disposed at another end of the slide groove, for ejecting the stylus from the slide groove when the movable arm is moved away from the rabbet of the stylus.

* * * * *